(12) United States Patent
Reynolds et al.

(10) Patent No.: US 9,403,346 B2
(45) Date of Patent: Aug. 2, 2016

(54) IMAGE CARRYING LAMINATED MATERIAL

(75) Inventors: Milton Charles Reynolds, Victoria (AU); Anthony John Luke Anderson, Victoria (AU); Gerard Michael McCluskey, Victoria (AU)

(73) Assignee: DIGIGLASS PTY. LTD., Victoria (AU)

( * ) Notice: Subject to any disclaimer, the term of this patent is extended or adjusted under 35 U.S.C. 154(b) by 711 days.

(21) Appl. No.: 10/363,279

(22) PCT Filed: Sep. 3, 2001

(86) PCT No.: PCT/AU01/01106
§ 371 (c)(1),
(2), (4) Date: Mar. 26, 2004

(87) PCT Pub. No.: WO02/18154
PCT Pub. Date: Mar. 7, 2002

(65) Prior Publication Data
US 2004/0234735 A1    Nov. 25, 2004

(30) Foreign Application Priority Data

Sep. 1, 2000 (AU) ........................ PQ9830
Oct. 4, 2000 (AU) ........................ PR0567
Dec. 20, 2000 (AU) ........................ PR2194

(51) Int. Cl.
*B32B 17/10* (2006.01)
*B41M 5/52* (2006.01)
(Continued)

(52) U.S. Cl.
CPC ..... *B32B 17/10899* (2013.01); *B32B 17/10036* (2013.01); *B32B 17/1077* (2013.01);
(Continued)

(58) Field of Classification Search
CPC .................. B32B 17/10036; B32B 17/10247; B32B 17/10275; B32B 17/10899; B32B 17/10935
See application file for complete search history.

(56) References Cited

U.S. PATENT DOCUMENTS 2,739,080 A * 3/1956 Woodworth ..................... 8/445
3,388,032 A    6/1968 Saunders
(Continued)

FOREIGN PATENT DOCUMENTS

AU    2001-54478 A    1/2002
BE    836936    6/1976
(Continued)

OTHER PUBLICATIONS

PCT International Search Report—Counterpart PCT/AU01/01106.
(Continued)

*Primary Examiner* — Christopher Schatz
(74) *Attorney, Agent, or Firm* — Oblon, McClelland, Maier & Neustadt, L.L.P.

(57) ABSTRACT

A method of producing image carrying laminated material comprises the steps of forming an image by ink jet printing on a first surface of a sheet of interlayer using solvent based ink, solvent based paint or solvent based dye system(s), interposing an interlayer comprising the sheet of interlayer between two sheets of material, and joining the two sheets of material to form the laminate by activating the interlayer. In addition, a method of producing an image carrying laminated safety glass comprising the steps of mechanically stabilizing a sheet of heat softening interlayer, forming an image on a first surface of the interlayer by ink jet printing using solvent based ink, solvent based paint or solvent based dye, removing the mechanical stabilization, interposing an interlayer comprising the sheet of heat softening interlayer between two sheets of glass and joining the two sheets of glass to form the laminated safety glass by heating the interlayer. Further, an image carrying laminated sheet, comprising two sheets of material joined by an interlayer comprising a sheet of interlayer having an image formed on a first surface of the interlayer by ink jet printing using solvent based ink, solvent based paint or solvent based dye system(s).

21 Claims, 9 Drawing Sheets

(51) Int. Cl.

| | |
|---|---|
| *B44C 3/02* | (2006.01) |
| *B44C 5/04* | (2006.01) |
| *B44F 1/06* | (2006.01) |
| *C03C 17/00* | (2006.01) |
| *C03C 17/34* | (2006.01) |
| *B41M 5/00* | (2006.01) |
| *B41M 7/00* | (2006.01) |

(52) U.S. Cl.
CPC ..... *B32B17/10247* (2013.01); *B32B 17/10275* (2013.01); *B32B 17/10761* (2013.01); *B32B 17/10935* (2013.01); *B41M 5/0047* (2013.01); *B41M 5/0064* (2013.01); *B41M 5/52* (2013.01); *B41M 7/0027* (2013.01); *B44C 3/02* (2013.01); *B44C 5/0407* (2013.01); *B44C 5/0446* (2013.01); *B44F 1/066* (2013.01); *C03C 17/002* (2013.01); *C03C 17/34* (2013.01); *B41M 5/5254* (2013.01); *B41M 5/5281* (2013.01); *C03C 2217/485* (2013.01); *Y10T 428/24876* (2015.01)

(56) References Cited

U.S. PATENT DOCUMENTS

| | | | |
|---|---|---|---|
| 3,437,552 A | 4/1969 | Bowen | |
| 3,458,388 A | 7/1969 | Moyniham | |
| 3,551,406 A | 12/1970 | Idelson | |
| 3,591,406 A * | 7/1971 | Moyniham | 427/211 |
| 3,629,044 A * | 12/1971 | Sanger | 428/156 |
| 3,973,058 A | 8/1976 | Grover et al. | |
| 4,035,549 A | 7/1977 | Kennar | |
| 4,138,284 A | 2/1979 | Postupack | |
| 4,168,254 A | 9/1979 | Fell | |
| 4,173,672 A | 11/1979 | Mannheim | |
| 4,230,775 A | 10/1980 | Derick et al. | |
| 4,303,718 A | 12/1981 | Snelgrove | |
| 4,339,567 A | 7/1982 | Green et al. | |
| 4,364,786 A | 12/1982 | Smith, Jr. et al. | |
| 4,391,867 A | 7/1983 | Derick et al. | |
| 4,398,014 A | 8/1983 | Green et al. | |
| 4,600,627 A | 7/1986 | Toshio et al. | |
| 4,624,912 A | 11/1986 | Zweifel et al. | |
| 4,868,288 A | 9/1989 | Meier | |
| 4,869,966 A | 9/1989 | Samuelson et al. | |
| 4,968,553 A | 11/1990 | Cesar | |
| 4,976,805 A | 12/1990 | Ishii et al. | |
| 5,049,433 A | 9/1991 | Leotta | |
| 5,085,698 A | 2/1992 | Ma et al. | |
| 5,104,448 A | 4/1992 | Kruse | |
| 5,227,241 A * | 7/1993 | Chaussade et al. | 428/437 |
| 5,231,131 A | 7/1993 | Chu et al. | |
| 5,364,479 A | 11/1994 | Boattini et al. | |
| 5,389,723 A | 2/1995 | Iqbal et al. | |
| 5,455,103 A | 10/1995 | Hoagland et al. | |
| 5,472,789 A | 12/1995 | Iqbal et al. | |
| 5,519,085 A | 5/1996 | Ma et al. | |
| 5,698,018 A | 12/1997 | Bishop et al. | |
| 5,712,672 A | 1/1998 | Gooray et al. | |
| 5,721,086 A | 2/1998 | Emslander et al. | |
| 5,747,148 A | 5/1998 | Warner et al. | |
| 5,766,398 A | 6/1998 | Cahill et al. | |
| 5,792,560 A | 8/1998 | Friedman et al. | |
| 5,795,425 A | 8/1998 | Brault et al. | |
| 5,837,375 A | 11/1998 | Brault et al. | |
| 5,884,909 A * | 3/1999 | Umeda | 271/242 |
| 5,886,075 A | 3/1999 | Keane et al. | |
| 5,914,178 A | 6/1999 | Sol et al. | |
| 6,001,482 A | 12/1999 | Anderson et al. | |
| 6,077,339 A * | 6/2000 | Nyssen et al. | 106/31.77 |
| 6,077,374 A | 6/2000 | Hopfe | |
| 6,083,310 A * | 7/2000 | Peterson et al. | 106/31.27 |
| 6,095,636 A * | 8/2000 | Shioya et al. | 347/43 |
| 6,113,679 A * | 9/2000 | Adkins et al. | 106/31.6 |
| 6,159,608 A | 12/2000 | Friedman et al. | |
| 6,165,593 A | 12/2000 | Brault et al. | |
| 6,200,647 B1 | 3/2001 | Emslander et al. | |
| 6,247,809 B1 | 6/2001 | Kashiwagi et al. | |
| 6,264,321 B1 | 7/2001 | Bugner et al. | |
| 6,302,523 B1 * | 10/2001 | Smith et al. | 347/45 |
| 6,423,170 B1 | 7/2002 | Friedman et al. | |
| 6,494,943 B1 | 12/2002 | Yu et al. | |
| 6,506,245 B1 | 1/2003 | Kinney et al. | |
| 6,737,151 B1 | 5/2004 | Smith | |
| 2003/0022001 A1 | 1/2003 | Durbin et al. | |

FOREIGN PATENT DOCUMENTS

| | | | | |
|---|---|---|---|---|
| BR | PI9104893 | | 8/1993 | |
| DE | 297 06 880 | | 5/1997 | |
| DE | 19743804 A1 | * | 4/1999 | |
| DE | 201 00 717 | | 4/2001 | |
| EP | 0 254 187 A2 | | 1/1988 | |
| EP | 811505 | | 12/1997 | |
| EP | 0 921 012 A1 | | 6/1999 | |
| EP | 0 951 499 B1 | | 10/1999 | |
| EP | 1114734 | | 7/2001 | |
| EP | 1129844 | | 9/2001 | |
| FR | 2 411 869 | | 7/1979 | |
| FR | 1 485 713 | | 6/1987 | |
| FR | 2 639 631 | | 6/1990 | |
| GB | 2 010 300 A | | 6/1979 | |
| JP | S50-065584 | | 6/1975 | |
| JP | 56-032351 | | 4/1981 | |
| JP | 56-129649 | | 10/1981 | |
| JP | 60 016840 | | 1/1985 | |
| JP | 6-73871 | * | 3/1994 | E04F 15/16 |
| JP | 06-073871 | | 3/1994 | |
| JP | 07-068703 | | 3/1995 | |
| JP | 10-195784 | * | 7/1998 | D06P 5/00 |
| JP | 10-296906 | | 11/1998 | |
| JP | 10-305456 | | 11/1998 | |
| JP | H11-286167 | | 10/1999 | |
| JP | 2002-307639 | | 10/2002 | |
| WO | 95/32871 | | 12/1995 | |
| WO | WO 95/32871 | | 12/1995 | |

OTHER PUBLICATIONS

PCT Written Opinion—Counterpart PCT/AU01/01106.
Supplementary European Search Report—European counterpart EP 01 96 4744.
European Patent Office Communication—Counterpart 01 964 744. 5-2124—Feb. 15, 2006.
European Patent Office Abstracts of Japan—Publication No. 07068703—Publication Date Mar. 14, 1995—Applicant Inax Corp.—Decorative Molding of Bathtub.
European Patent Office Abstracts of Japan—Publication No. 10296906—Publication Date Nov. 10, 1998—Applicant Mitsubishi—Metal Decorative Panel, Its Manufacture, and Printing Device for Metal Plate.
European Patent Office Abstracts of Japan—Publication No. 10305456—Publication Date Nov. 17, 1998—Applicant: Seiko Epson Corp.—Transfer Sheet for Foil Decorating.
European Patent Office Communication—Counterpart 01 964 744. 5-2124—Feb. 7, 2005.
European Patent Office Communication—Counterpart 01 964 744. 5-2124—Aug. 6, 2004.
Screen Service AB, Technical information, Digital Print on PVB http://www.screenservice.com/techinfo/index_en.html.
Screen Service AB, Products, http://www.screenservice.com/products/index_en.html.
Screen Service AB, Home, http://www.screenservice.com/index_en.html (2004).
Patentee's Submission in response to the European Oppositions filed by by Glas Trösch AG, Glaverbel S.A. and Solutia Inc., including claims accoding to the main request, first auxillary request and second auxillary request.
Hewlett-Packard,"Milestones in inkjet technology", http://www.hp.com/oeminkjet/about_TIJ/history/milestones.html.

(56) References Cited

OTHER PUBLICATIONS

Hewlett-Packard, "Printing through the decades", http://www.hp.com/oeminkjet/about_TIJ/history/decades.html.
Cannon, 1981 Canon develops Bubble Jet printing technologies., http://www.canon.com/about/history/episode07f.html.
Cannon, Prologue to Becoming an Excellent Global Corporation (1982-1986), http://www.canon.com/about/history/08.html.
Cannon, Successful Diversification and Business Expansion (1976-1981), http://www.canon.com/about/history/07.html.
Epson Corporate Information, U.S. History, http://www.epson.com/cgi-bin/Store/AboutCorpHistory.jsp?BV_UseBVCookie=yes.
IBM, IBM Highlights 1985-1989, http://www-03.ibm.com/ibm/history/documents/pdf/1985-1989.pdf.
IBM, IBM Highlights 1970-1984,http://www-03.ibm.com/ibm/history/documents/pdf/1970-1984.pdf.
Todd A. Cleland, "Printed Electronics: The Next Inkjet Revolution?", Massachusetts Institute of Technology (2003).
Glaverbel Communication dated Apr. 10, 2008 to EPO Concerning Opposition of counterpart EP 1 322 482.
English Translation—Kirkpatrick Cover Letter to AGC Flat Glass/Glaverbel Communication dated Apr. 10, 2006 to EPO Concerning Opposition of counterpart EP 1 322 482.
English Translation—Revised 4.2 and 4.3 to AGC Flat Glass/Glaverbel Opposition.
English Translation—Change of Corporate Name—Glaverbel to AGC Flat Grass.
English Translation—Appendix 6—SeriComex International AB Jun. 9, 2000.
3M Product Bulletin 3545C "Controltac™ Removable Graphic Film with Comply™ Adhesive 3545C and RG3545C" (2009).
3M Product Bulletin PIJ162 Controltac• Plus Graphic Film Series IJ162 and Film RG162-10 (2006).
3M Product Bulletin 3650—Scotchcal™ Graphic Film Series 3650 (2006).
3M Product Bulletin 3690—Scotchcal™ Graphic Film Series 3690 (2006).
3M Product Bulletin 3630—Scotchcal™ Translucent Graphic Film Series 3630 (2006).
3M Product Bulletin 3470—Scotchcal™ Graphic Film 3470 and 3475 (2006).
3M Scotchcal™ Graphic Films Webpage (2009).
3M™ Scotchcal™ Translucent Graphic Film Series 3630 Webpage (2009).
3M™ Scotchcal™ Graphic Film Series 3650 Webpage (2009).
3M™ Scotchcal™ Graphic Film Series 3690 Webpage (2009).
3M™ Scotchcal™ Graphic Film Series 3470 Webpage (2009).
Australian Patent Office—Examiner's report No. 2 on patent application No. 2001285590 by Digiglass Pty. Ltd.
Amendment—Amending a Specification Examination Response Notice of Entitlement dated Jun. 19, 2009 re Re: Digiglass Pty Ltd Australian Patent Application No. 2001285590 "Image carrying laminated material".
"HP Virtual Museum, HP ThinkJet, 1984" http://www.hp.com/hpinfo/abouthp/histnfacts/museum/imagingpringiting/0011/index.html.
DuPont™ Butacite® PVB Safety Glass Interlayers (2010).
Solutia Saflex® PV Solutions, Encapsulant Technology for Thin Film Solar Modules (2010).
Kuraray. It is entitled Architecture, PVB Film for Laminated Safety Glass (2010).
Solutia Saflex® PA41 High Flow PVB Encapsulant (2010).
Wikipdeia, "Polyvinyl butyral" (printed Mar. 29, 2011).
Solutia Butvar® B-76 Data Sheet (No date, printed Mar. 28, 2011).
Solutia Butvar® Polyvinyl Butyral Resin Properties S & Uses.
Butvar Polyvinyl Butyral (PVB) Resin webpage (printed Mar. 29, 2011).
Japanese Patent Application No. 2002-523297 English Translation of Official Notice of Rejection dated Jan. 25, 2011.
First Office Action issued on Nov. 3, 2014 in with Chinese Patent Application No. 201310388396.7 filed Sep. 3, 2001 with English Translation.
Search Report dated Oct. 24, 2014 in Chinese Patent Application No. 201310388396.7 filed Sep. 3, 2001 with English Translation.
Opposition against counterpart EP 1 322 482 by Solutia Inc.
Opposition against counterpart EP 1 322 482 by Glaverbel SA and English translation thereof.
Opposition against counterpart EP 1 322 482 by Glas Trosch AG and English translation thereof.
W. E. Hass, "Non-impact printing technologies" Ch. 13. pp. 379-384, E-5 of Glaverbel Opposition.
Kacey King, "MetroMedia Marches to its Own Drum", The Big Picture, Feb. 2006, extract from the website www.mmt.com, E-8 of Glaverbel Opposition.
Jean Bost, "Matieres Plastiques", p. 190, published in 1992, E-9 of Glaverbel Opposition.
Butvar Polyvinyl Butyral Resin, undated, (Solutia) extract from the website www.butvar.com, E-11 of Glaverbel Opposition.
Concepta, ColorGlass (R), undated, extract from the website www.colorglass.com, E-12 of Glaverbel Opposition.
Spec-Data Sheet ChromaFusion® Architectural Glass, May 1993, E11 of GlassTrosch AG Opposition.
Auszug vom 20. Jul. 2007 aus www.wikipedia.de zu "Tintenstrahldrucker", E12 of GlassTrosch AG Opposition.
CastleinkTM, "A Brief History of the Ink Jet Printer", www.castleink.com zur Geschichte des Tintenstrahidrucks, E13 of GlassTrosch AG Oppostion.

* cited by examiner

IMAGE CARRYING LAMINATED MATERIAL

TECHNICAL FIELD

This invention relates to the production of laminated material with an image that is visible from one or both sides of the material. The material may be made of any suitable substrate such as glass, polycarbonate, acrylic, cellulose acetate butyrate (CAB) or other thermoplastic resins. The image may take the form of a pattern, artistic work, written indicia or any other visually discernible form.

BACKGROUND ART

Laminated materials, particularly laminated glass, have many applications as a construction material. They can for example be used to form windows, walls, doors and screens. They can also be used for the construction of articles such as coffee tables, and other small articles of furniture. Laminated materials are specified or desired in a number of applications as a result of their inherent safety characteristics compared to normal glass sheets. Laminated materials are typically formed by joining two sheets of material using a polyvinyl butyral interlayer or a polyether based aliphatic thermoplastic polyurethane interlayer, such as PE399 Krystalflex® film, produced by Morton International, Inc., or the like. The production process normally involves two steps. In one step the interlayer is placed between the two sheets of material and heated as it passes through nip rollers that squeeze the sheets of material into contact with the softened interlayer. A further step involves the treatment of the laminate so formed in an autoclave to complete the bonding process.

In many applications it is desirable to provide some form of image on the laminated material. The image can be for the purposes of decoration or can serve a functional purpose by partially or completely obscuring the view through the laminated sheet. Hitherto attempts to produce laminated material with images have presented serious practical problems. One way that an image has been formed on laminated material such as glass is by screen printing onto the finished laminated sheet. This is a cumbersome process and limits the images that can be produced both in colour and detail. For example a multi-colour image requires a printing step for each colour. Additionally the images can only be formed on discrete panels and for practical purposes this means that the images cannot be formed in a regular manner so that the panels can be subsequently arbitrarily cut.

Other attempts have been made to place images on laminated material. These have taken the form of introducing an additional layer of some type that carries the image into the laminated sheet. This approach has the disadvantage of directly interfering with the strength of the bond formed between the sheets of material. This is because the image carrying material results in a reduction in available area for bonding.

In another approach described in U.S. Pat. No. 4,968,553 a printed polyurethane sheet has been used to laminate two sheets of glass together to form an image carrying laminated sheet. The polyurethane sheet is printed with non-solvent-based inks so that there is no chemical reaction with the urethane. The commercial application of this process has been limited mainly due to the need for a polyurethane sheet rather than a conventional interlayer such as PVB.

Brazilian patent application 910 4893 describes an attempt to print directly on PVB interlayer. This application describes the use of an acrylic paint to form an image on the PVB prior to laminating. Acrylic paints have been found to have a significant detrimental affect on bonding between the interlayer and the adjacent glass surfacing during lamination.

DISCLOSURE OF THE INVENTION

In one aspect this invention provides a method of producing image carrying laminated material including the steps of forming an image on a first surface of a sheet of interlayer using solvent based ink, paint or dye systems, interposing the sheet of interlayer between two sheets of material, and joining the two sheets of material to form the laminate by activating the interlayer.

In a second aspect this invention provides an image carrying laminated sheet including two sheets of material joined by an interlayer, the image being formed on a first surface of the interlayer by solvent based ink, paint or dye systems.

In a third aspect this invention provides an interlayer carrying an image on a first surface formed using solvent based ink, paint or dye systems.

The joining step can include joining one or more additional interlayers to the interlayer bearing the image. In one form of the invention, an additional interlayer is joined to the image bearing interlayer on its image bearing face. In another from of the invention, additional interlayers can be joined to each face of the image bearing interlayer. Multiple interlayers can also be joined to each face of the image bearing interlayers.

The interlayers are preferably joined to each other as part of the laminating process.

Preferably, the interlayer is formed from polyvinyl butyral. The interlayer may also be formed from a polyether based aliphatic thermoplastic polyurethane interlayer or the like.

In a further aspect this invention provides a method of producing image carrying laminated material including the steps of mechanically stabilizing a sheet of interlayer, forming an image on a first surface of the interlayer, removing the mechanical stabilization, interposing the interlayer between two sheets of material and joining the two sheets of material to form the laminate by activating the interlayer.

The joining step can include joining one or more additional interlayers to the interlayer bearing the image. In one form of the invention, an additional interlayer is joined to the image bearing interlayer on its image bearing face. In another from of the invention, additional interlayers can be joined to each face of the image bearing interlayer. Multiple interlayers can also be joined to each face of the image bearing interlayers.

The interlayers are preferably joined to each other as part of the laminating process.

It is also preferred in this further aspect, that the interlayers are preferably formed from polyvinyl butyral. The interlayers can also be formed from a polyether based aliphatic thermoplastic polyurethane interlayer, such as PE399 Krystaflex® film. Preferably the image is formed on the interlayer using solvent based ink, paint, or dye systems. These systems may contain pigment and/or other additives.

In one strongly preferred form of the invention the image is printed onto the interlayer using a piezo electric drop-on-demand digital printing process. This process uses solvent based ink, paint or dye systems.

The mechanical stabilization can in one form of the invention be achieved by using a mechanical connection between the interlayer and a removable membrane ox substrate. The removable membrane can take any suitable form. The removable membrane can be a paper backing sheet adhered directly to the interlayer. The removable membrane can also be a suitable sheet material attached to the edges of the interlayer in any suitable manner. The attachment can for example be achieved by adhesive tape. Suitable materials for the removable backing also include fiber reinforced vinyl. In some processes the mechanical stabilization can be provided by an attachment to a component of the printing machine.

The removable membrane or substrate keeps the interlayer taut and allows it to be handled without deformation during the process of forming the image. Some of the processes suitable for forming the image require the interlayer to be moved through a system at a consistent rate to prevent "banding and misses" in the printing. Additionally, many of the processes suitable for forming the image on the interlayer involve the use of heat. The interlayer is very heat sensitive and typically loses much of its mechanical strength at temperatures of 60° C. and above. The use of a backing membrane or substrate allows the interlayer to be handled in systems involving the use of heat without stretching or damage.

As will be appreciated by those skilled in the art the term "solvent based ink, paint, or dye system" used in this specification refers to a system in which a colouring agent is carried in a suitable organic solvent or solvents. In the case of ink, for example, a pigment is dispersed in an organic solvent or solvents. These inks include so called "oil based" inks.

Use of solvent based ink, paint or dye systems to form the image on the interlayer has been found to not interfere with the bonding process between the interlayer and the sheet material. It is thought that this is a result of the solvent based ink, paint or dye systems etching into the surface of the interlayer and resulting in areas of the interlayer that are screened from and consequently not bonded to the adjacent sheet of material. This is in contrast for example to acrylic based carriers for pigments which tend to pool and reticulate on the surface of the interlayer. This results in a region of the interlayer that cannot bond to the adjacent sheet of material and thus prevents a successful laminated sheet of material being formed.

In the case of solvent based inks and in particular oil based inks the organic solvent has been formed to provide a key for the pigment to bind firmly to the interlayer.

The use of additional interlayers in one form of the invention increases the bond strength of the laminate. The additional interlayers may be joined to one face of the image bearing interlayer. This may be the face bearing the image.

Alternatively, additional interlayers may be joined to either face of the image bearing interlayer or both faces.

The additional interlayers are joined to the image bearing interlayer as part of the laminating process. That is, the interlayers (including the image bearing interlayer) are laid or stacked together between the sheets of laminate material, and so bond together when the entire interlayer-sheet sandwich is laminated.

In addition, it is believed that the additional interlayers may also protect the image from exposure to light, especially UV in sunlight. This may assist in inhibiting fading of the ink in the image, retaining the clarity of the image and increasing the longevity of the image in the laminated material.

Preferably, the image is allowed to cure on the interlayer before the interlayer is used in the lamination process. Depending upon ambient temperatures a curing period of up to 24 hours or more has been found to be beneficial in some cases. It is believed that the improvement is a result of additional solvent evaporation and possibly further etching of the remaining ink, paint or dye into the interlayer.

The image can be formed on interlayer of any appropriate type. For example the image can be printed on interlayers that are substantially transparent once laminated between two sheets. Alternatively, interlayers that are designed to be opaque or partially opaque through for example colouring can be used. Interlayers of any thickness otherwise appropriate for the laminating of the particular sheet material can be used. Commonly available interlayers are in multiples of 0.38 mm in thickness.

The invention will now be further described, by way of example only, with reference to the accompanying drawings and examples

BEST MODES FOR CARRYING OUT THE INVENTION

The following description and examples refer to the manufacture of a laminated safety glass product according to and using the method of the invention using PVB interlayer. The invention is equally applicable to other laminated materials and to the use of different forms of interlayer.

FIGS. 1 to 8 show four different embodiments of image carrying laminated safety glass formed according to this invention. The processes for forming the image will be described with reference to FIGS. 9 to 16 below and the laminating process will be described by reference to FIG. 17.

Figure 1:
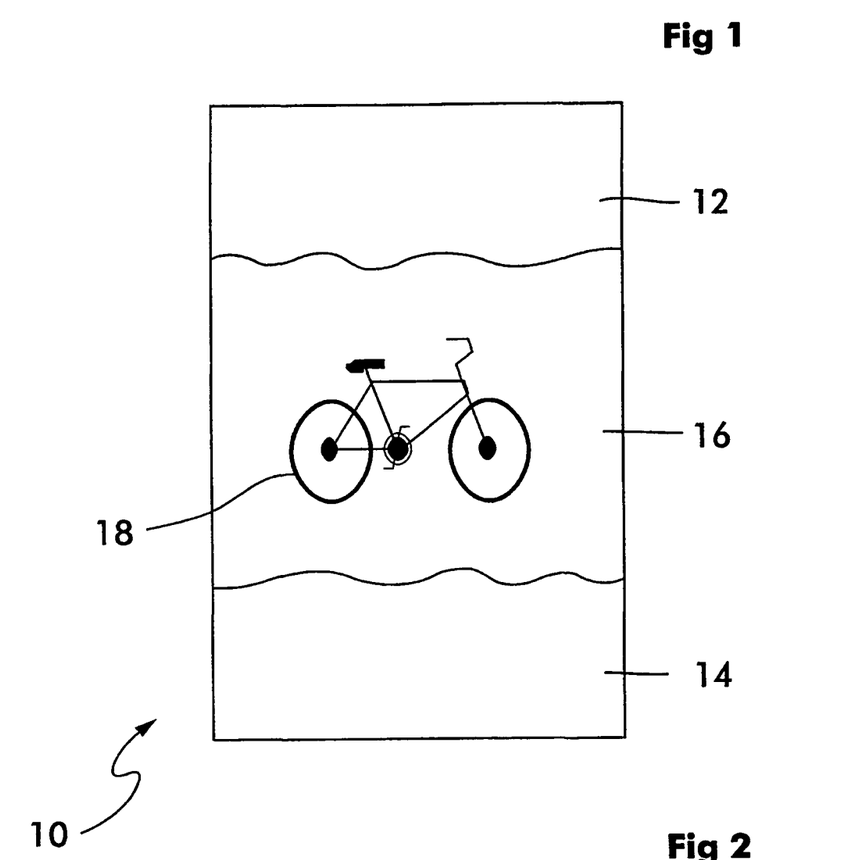
FIG. 1 is a schematic elevation of a sheet of laminated safety glass according to a first embodiment of this invention showing layers partly cut away for illustrative purposes.
Figure 2:
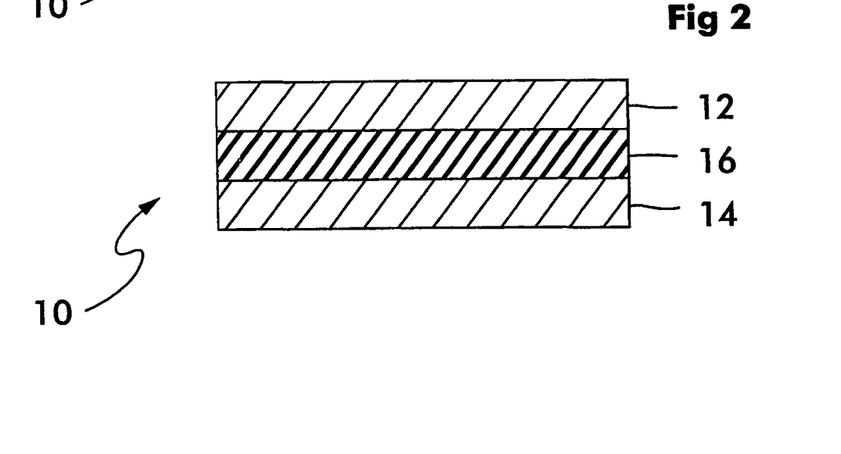
FIG. 2 is a schematic sectional view of the sheet of safety glass shown in FIG. 1.

Referring to FIGS. 1 and 2 the laminated safety glass 10 is formed by two sheets of glass 12, 14 joined by a PVB interlayer 16 on which an image 18 is printed using solvent based ink.

Figure 3:
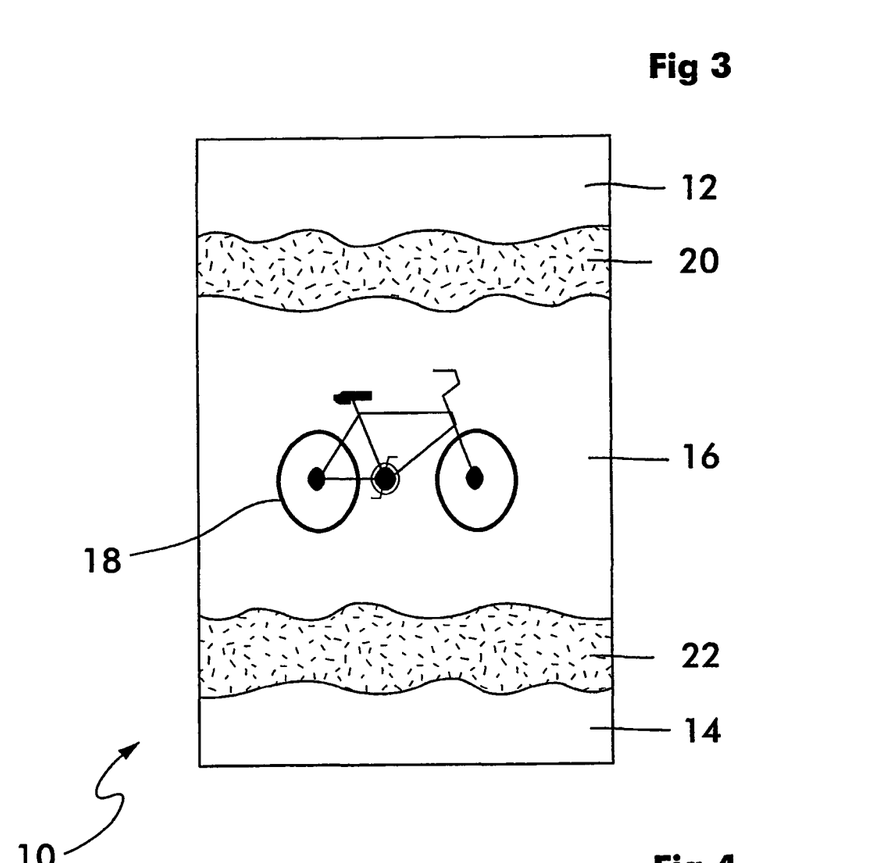
FIG. 3 is a schematic elevation of a sheet of laminated safety glass according to a second embodiment of this invention showing layers partly cut away for illustrative purposes.
Figure 4:
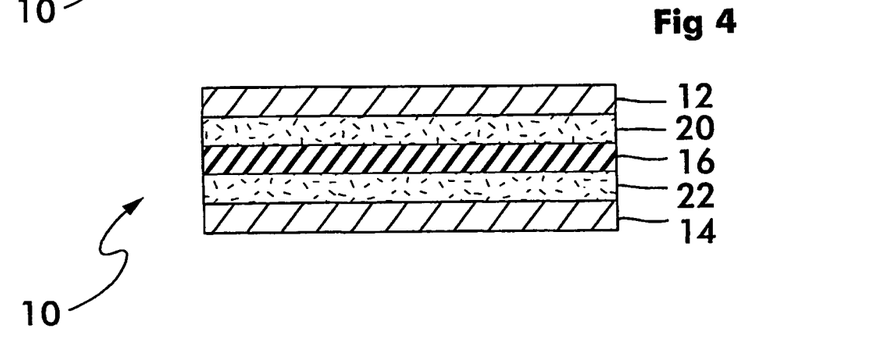
FIG. 4 is a schematic sectional view of the sheet of safety glass shown in FIG. 3.

FIGS. 3 and 4 show a sheet of laminated safety glass according to a second embodiment of the invention. The same reference numerals have been used for corresponding features of the drawings. In this form of the invention two additional PVB interlayers 20, 22 without printing are interposed between the interlayer 16 and the corresponding sheet of glass 12, 14. That is, there is a second sheet of interlayer 20 between the surface of interlayer 16 on which image 18 is printed and the sheet of glass 12 adjacent that surface. The third sheet of interlayer 22 is interposed between the surface of the interlayer 16 opposite the surface on which the image 18 is formed and the sheet of glass 14 adjacent that opposite surface.

Figure 5:
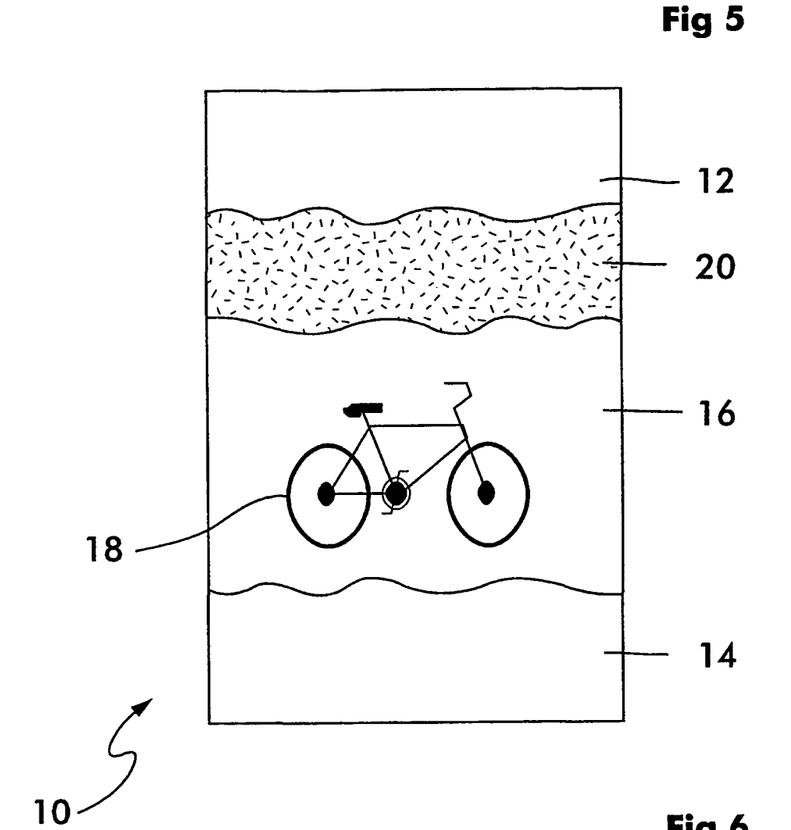
FIG. 5 is a schematic elevation of a sheet of laminated safety glass according to a third embodiment of this invention showing layers partly cut away for illustrative purposes.
Figure 6:
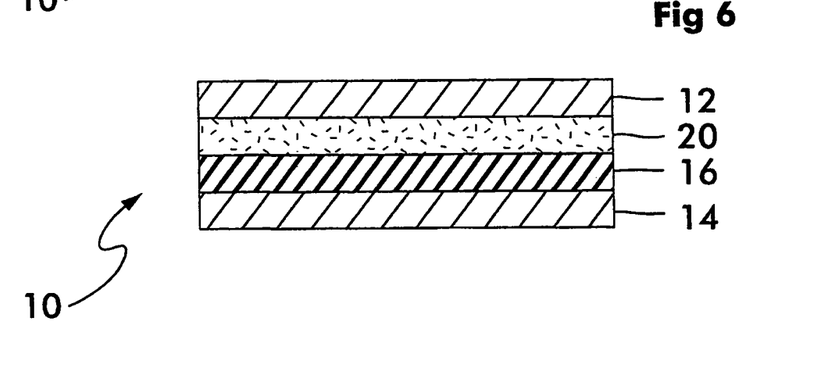
FIG. 6 is a schematic sectional view of the sheet of safety glass shown in FIG. 5.

FIGS. 5 and 6 show a sheet of laminated glass according to a fourth embodiment of this invention. The same reference numerals have been used to identify corresponding features of the drawings. In this form of the invention a single additional sheet of PVB interlayer without printing is interposed between the surface of interlayer 16 on which image 18 is printed and the adjacent sheet of glass 12.

Figure 7:
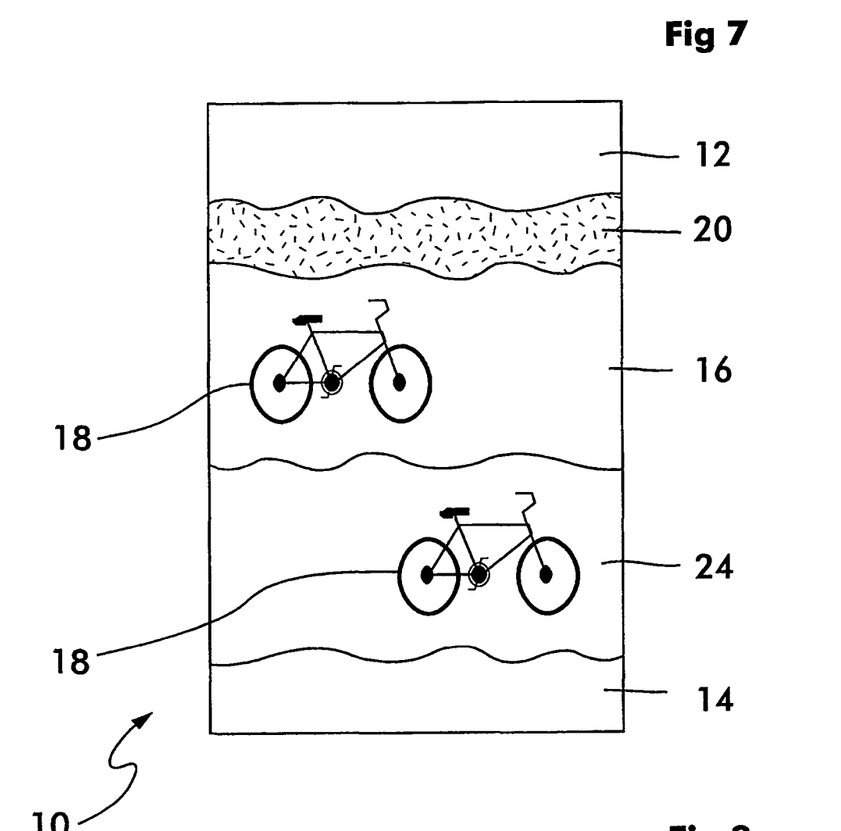
FIG. 7 is a schematic elevation of a sheet of laminated safety glass according to a fourth embodiment of this invention showing layers partly cut away for illustrative purposes.
Figure 8:
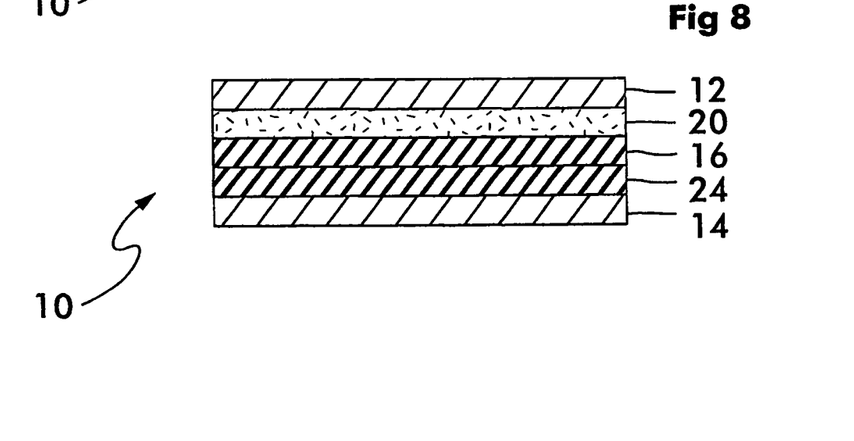
FIG. 8 is a schematic sectional view of the sheet of safety glass shown in FIG. 7.

FIGS. 7 and 8 show a sheet of laminated glass according to a fourth embodiment of this invention. Again the same reference numerals have been used for corresponding features of the invention. In this form of the invention an additional sheet 24 of PVB interlayer has been printed with an image 18 using a solvent based ink. The interlayers 16 and 24 printed with images 18 are arranged adjacent each other and a further sheet of PVB interlayer 20 is interposed between the surface of interlayer 16 on which image 18 is printed and the adjacent sheet of glass 12. The use of two interlayers 16, 24 on which images have been printed spaces the images 18 apart and can be used to provide greater depth in the overall image presented when viewing the laminated safety glass 10.

FIGS. 9 to 16 show some of the ink jet printers suitable for use in the forming of the image on a PVB interlayer. In each case the printers are a wide format ink jet printer of commercially available type. It will be apparent to those skilled in the art that in order to use these machines to print an image onto any substrate suitable image data must be provided to the printer in a conventional manner. In most cases this involves firstly obtaining or preparing a digitised image. Suitable digital images can be produced on a conventional computer from a storage media such as a compact disc or by using conventional scanning technology to scan an original image. A suitable computer program such as Adobe® PhotoShop® is used to produce a postscript file. The postscript file can through suitable interfaces be used to provide the necessary data to the printer for reproduction of the image. In some cases additional software such as Postershop® RIP (Rastor Imaging Processing) can be used for scaling and colour correction before outputting the necessary data to the printer for reproduction of the image. In the following description the features of four different printers and their use as part of the method for the present invention are described.

Figure 9:
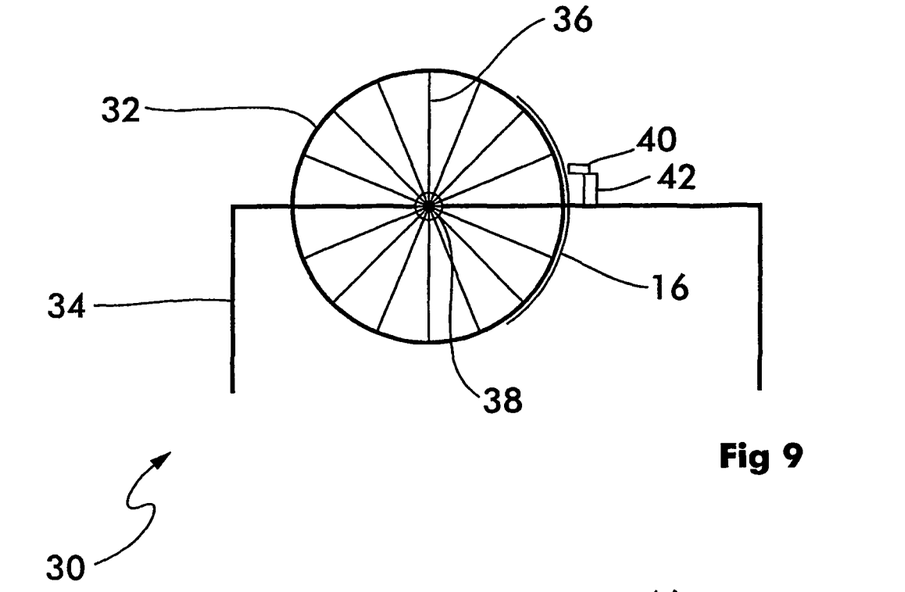
FIG. 9 is a schematic end elevation of a first printing machine used in performing the method of this invention.
Figure 10:
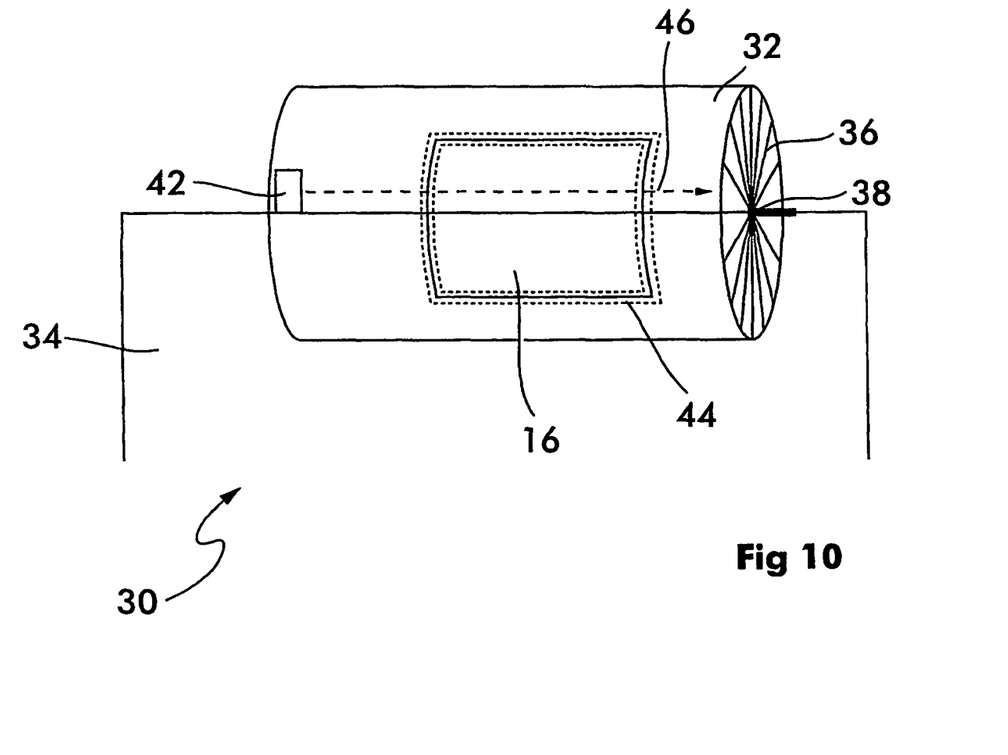
FIG. 10 is an elevation of the printing machine shown in FIG. 9.

FIGS. 9 and 10 schematically show the features of a large format ink jet printer known as an MMT (Metro Media Technologies International Inc.) paint jet system. This printer uses a large rotating drum 32 supported for rotation on an axle 38 by spokes 36. The frame of the printer is generally shown at the 34 and supports the drum in close proximity to a printing head 40 mounted on a carriage 42. As shown by arrow 46 in FIG. 10 the carriage 42 moves the print head 40 in an axial direction in response to printer control (not shown). The print head 40 is driven in the conventional manner by the printer electronics (not shown).

In this process the PVB interlayer 16 is mechanically stabilized by being attached to the surface of the drum 32. This is achieved by laying the interlayer 16 on the drum and taping the edges of the interlayer to the rotatable drum 32 using conventional adhesive tape shown in dotted outline at 44. It has been found that this attachment to the rotating drum component 32 of the printing machine 30 provides sufficient mechanical stabilization of the PVB interlayer to allow accurate printing on the surface as the drum 32 is rotated adjacent the print head 40 in the conventional manner.

The ink jet printer 30 uses an MIBK uses a solvent based automotive paint using an MIBK (methy isobutyl ketone) solvent.

Figure 11:
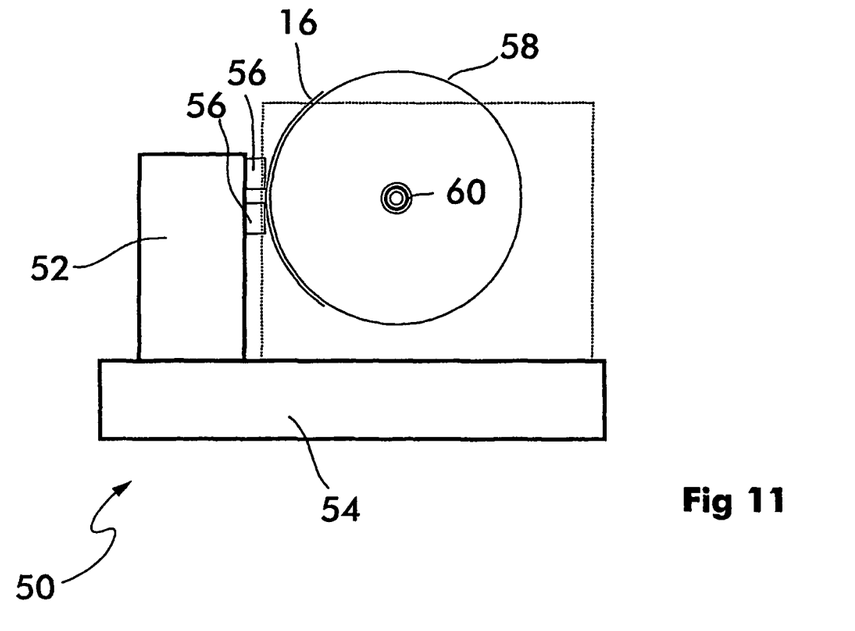
FIG. 11 is a schematic end elevation of a second printing machine used in performing the method of this invention.
Figure 12:
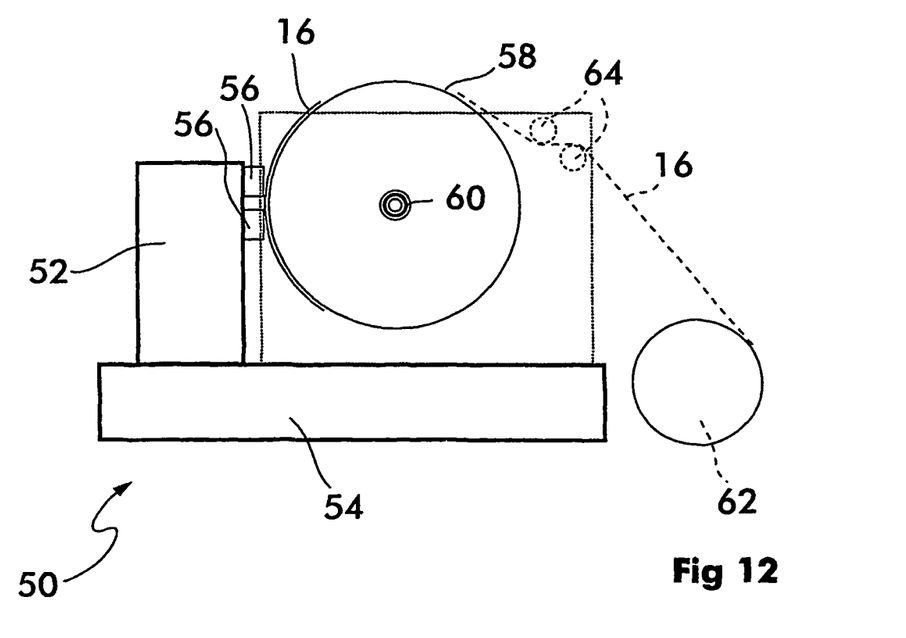
FIG. 12 is a view similar to FIG. 11 showing how the interlayer is fed to the printer.

FIGS. 10 and 11 schematically show an Idanit® ink jet printer 50. The ink jet printer 50 is somewhat similar to that described in relation to FIGS. 9 and 10 in that a rotating drum 58 is supported by an appropriate axle 60. A frame made up of a bed 54 and upright 52 positions two printheads 56 adjacent the drum 58. In this case the drum 58 is perforated by a series of apertures (not shown) and a vacuum is applied to the interior of the drum. This vacuum is used to hold and mechanically stabilize the PVB interlayer 16. As shown in FIG. 12 the interlayer 16 is loaded to the drum from a supply roll 16 by guide rollers 64. In most cases the leading edge of the interlayer 16 is initially taped to the drum 58 to prevent the interlayer coming into contact with printheads 56. Once a significant length of interlayer 16 is wrapped onto the drum the vacuum applied by the apertures (not shown) holds the interlayer in position for printing by the printheads 56 as the interlayer 16 is moved by rotation of drum 58 in the conventional manner.

THE printer 50 uses any suitable solvent based pigmented ink.

Figure 13:
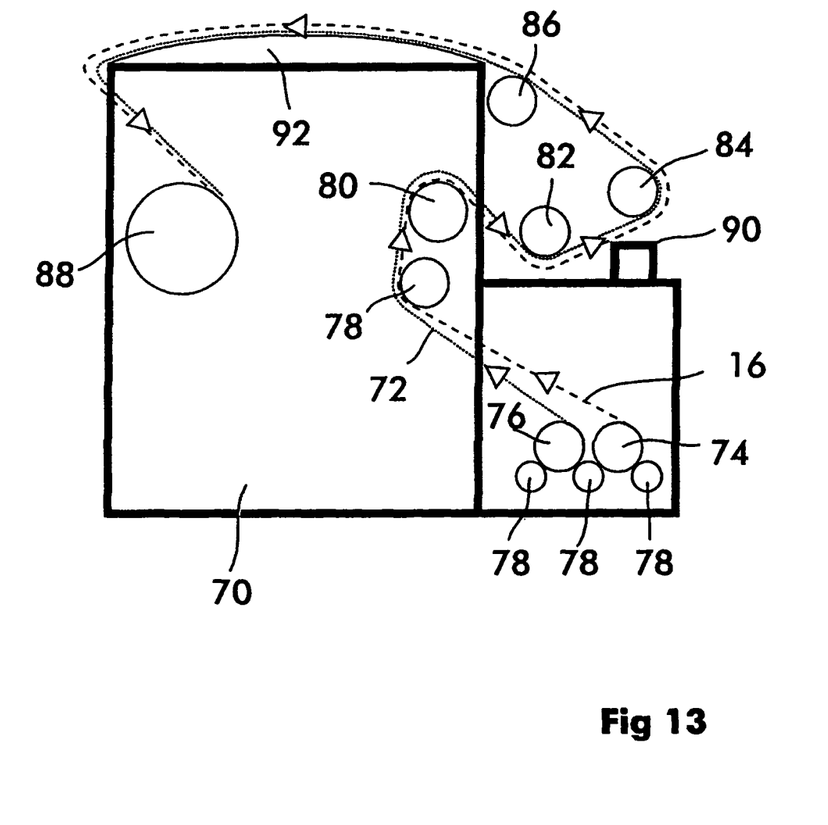
FIG. 13 is a schematic end elevation of a third printing machine used in performing the method of this invention.

FIG. 13 schematically shows a piezo electric drop-on demand wide format Vutek 5300 digital printing machine. This machine is manufactured by Vutek Inc.

The printer 70 operates by passing the material to be printed over a series of rollers passed a printhead 90. The printer 70 holds the material to be printed under tension between rollers 82 and 84 to provide a stable surface for printing. Because of the nature of the interlayer 16 it must be stabilized during the printing process. The stabilization is achieved using a sacrificial web 72 which passes through the printer 70 with the interlayer 16. The sacrificial web 72 can be fiber-reinforced vinyl or paper or any other material that does not stretch under moderate tension. In some applications the interlayer 16 can be taped to the sacrificial web 72. In others it is sufficient to pass the interlayer 16 and web 72 through the machine concurrently to provide the required mechanical stabilization.

As shown in the drawing the interlayer 16 is supplied from a feed roll 74 which sits on two of three rollers 78. A sacrificial supporting web 72 supplied from a similar roll 76 that also sits on two of rollers 78. This ensures that the two materials are fed at approximately the same speed. The interlayer 16 and web 72 pass around tensioning rollers 78 and 80 before passing around positioning rollers 82 and 84 between which the printing takes place. After passing roller 84 the interlayer 16, web 72 pass over a further roller 86 and a heating and drying surface 92 before being wound on a take up roller 88. The printer 70 tensions the web 72 to provide a stable surface for printing between rollers 82 and 84. The interlayer 16 is held against the web but the tension is maintained on the web 72 so that there is no significant tension applied to the interlayer 16. This ensures that the interlayer passes in front of the printhead 90 without being stretched or deformed in much the same way as any other substrate resulting in accurate printing.

The printer 70 uses solvent based pigmented ink such as those available from Inkwear Inc.

A suitable ink known as ULTRAVU-3 is available in the following colours:

| | |
|---|---|
| Cyan | Light Cyan |
| Magenta IID | Light magenta HD |
| Yellow | Black |
| Orange | Green |

These inks contain ethylene glycol monobutylether acetate in an amount of up to 80%, cyclohexanone in an amount up to 20%, methyl-2-pyrrolidinone in an amount up to 10% (Light magenta HD) and other ingredients not disclosed by the manufacturer.

Another suitable ink produced for a similar machine, known as the Arizona printing machine includes the following components:

| Ingredient name | Percentage |
|---|---|
| 2-Buxtoxethyl acetate | up to 70% |
| Propanol, 1 (or 2)-(2-Methoxymethylenethoxy)-, Acetate | up to 30% |
| Carbon Black | 1.0-5.0% |
| Vinyl Chloride-Vinyl Acetate Polymer | 1.0-5.0% |
| Acrylic Copolymer | 1.0-5.0% |
| NJ TS RN 121307-5038P | 1.0-5.0% |

Figure 14:
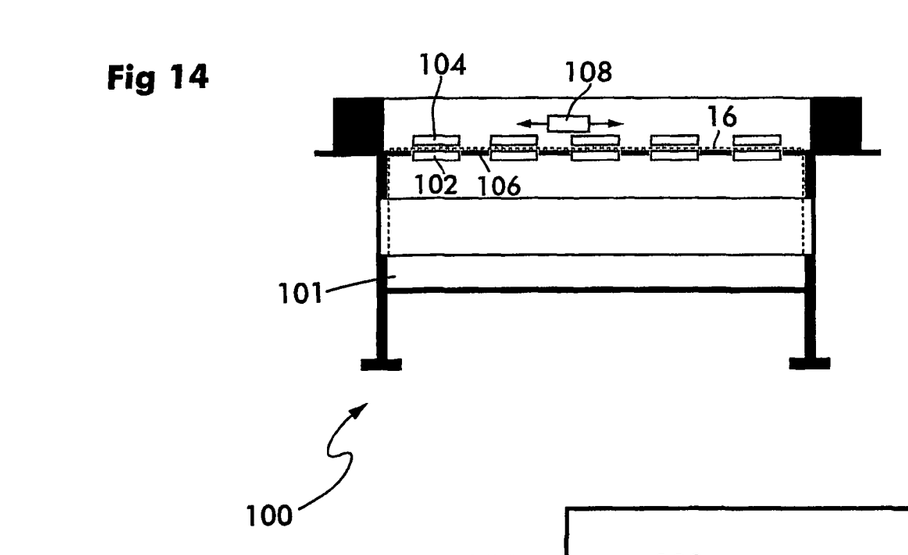
FIG. 14 is a schematic elevation of a fourth printing machine used in performing the method of this invention.
Figure 15:
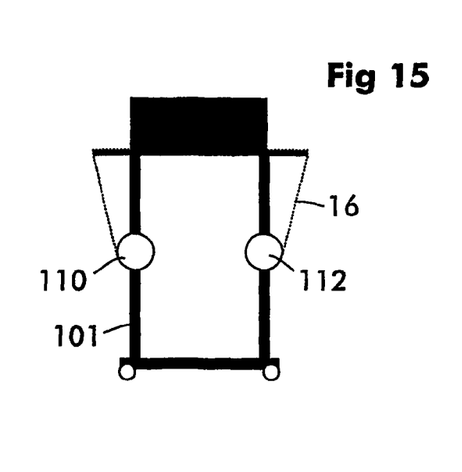
FIG. 15 is a schematic end elevation of the printer shown in FIG. 14.
Figure 16:
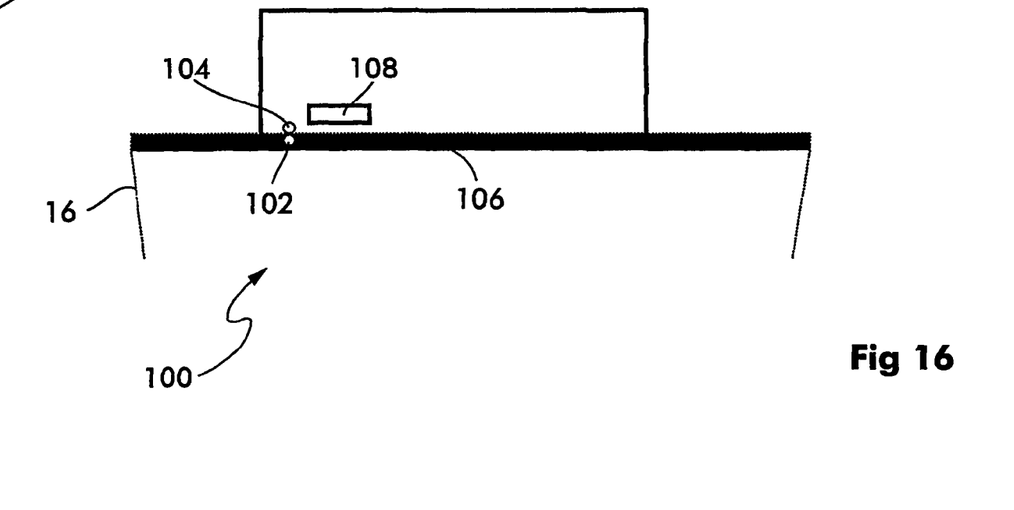
FIG. 16 is an enlarged view of part of FIG. 15.

FIGS. 14 to 16 schematically show a flat bed piezo electric drop-on-demand ink jet printer such as a Mutoh Falcon Jet 6100 from Eastech of Taiwan. The Falcon Jet 6100 is basically a standard Mutoh Falcon Jet 6000 which has a minor modification to the heads. The modification pre-heats the ink in the heads to change the viscosity of the ink and allow for proper flow of ink. This modification is necessary to use oil based inks in the printer.

As seen in the drawings the flat bed printer 100 has a frame 101 that supports an upper platen or bed 106. The interlayer 16 is stored on a supply roll 110 and is fed across the bed 106 to a takeup roller 112. The interlayer is moved by a pair of pinch rollers 102 and 104 positioned respectively above and below the interlayer 16 adjacent a printhead 108. The lower roller 102 is driven in a conventional manner to advance the interlayer 16 past the printhead 108 at a controlled rate.

The positioning of the interlayer 16 on the flat bed 106 adjacent the pinch rollers 104 and 102 mechanically stabilizes the interlayer for printing by the printhead. That is the interlayer is not under any appreciable tension and the desired accuracy of registration with respect to the printhead 108 can be achieved. This allows a very high quality image to be printed on the interlayer at a 360 dpi or 720 dpi. The Mutoh Falcon Jet 6100 printer is normally provided with data from a suitable computer. In order to drive the printer the computer uses software such as Onyx® Postershop® to translate the postscript data to Rastor Imaging Processing format for use by the printer. The ink used in the Mutoh Falcon Jet 6100 is supplied by Eastech and has the following composition:

| | |
|---|---|
| Dyestuffs | 8% |
| Ethyl Alcohol | 30% |
| Ethyl Acetate | 8.5% |
| Methyl Ethyl Ketone | 7% |
| N-butyl Acetate | 17.5% |
| Ethycese Glycol Monmethyl | 29% |

Figure 17:
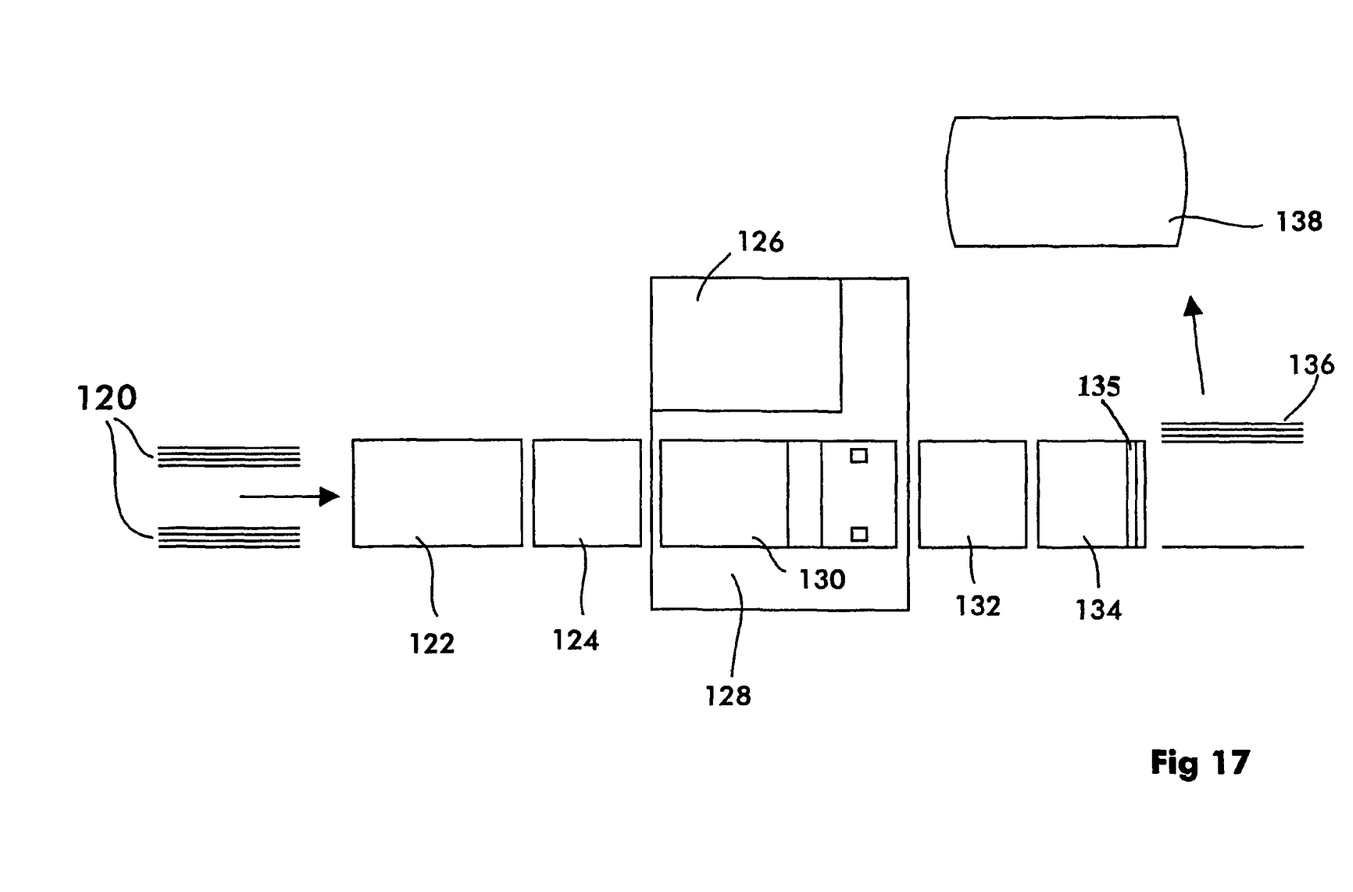
FIG. 17 is a schematic drawing of the equipment and steps in a glass laminating process.

Once the image has been formed on the interlayer by any one of the above techniques it is used to form a laminated glass sheet in the known manner. FIG. 17 schematically shows the lamination process.

The laminating process involves moving a raw glass sheet stock 120 across a table 122 to a washing machine 124. The previously printed polyvinyl butyral interlayer is normally stored in temperatures of controlled humidity at a temperature of around 6 to 7° C. in a storage area 126. The glass sheets 120 are moved to a table 130 in a lay up room 128 where they are maintained in a clean environment. From there the sheets move to a transfer table 132 where a first sheet has the image bearing interlayer laid across its surface. A second glass sheet is placed on top of the image bearing interlayer in close alignment with the first sheet to form a glass (image bearing) interlayer glass sandwich.

Alternatively, any required additional interlayers may be interposed between the image bearing interlayer and the glass sheets. For example, an interlayer can be laid on the first glass sheet, followed in succession by the image bearing interlayer, another interlayer and the second glass sheet. Thus, a glass-interlayer-image bearing interlayer-interlayer-glass sandwich is formed.

The sandwich is moved through an oven 134 operating at a temperature of approximately 200° C. before passing between nip rollers 135 exerting a pressure of around 10 bar. This results in the interlayer softening and bonding the two sheets of glass together. The nip rollers ensure that there is no entrapped air in the laminated sheet. The laminated sheets so formed are then transferred to an autoclave which typically operates at a temperature of 135° C. at a pressure of 11.5 bar. They are typically autoclaved for around 3.5 hours.

Example 1

Samples of laminated glass were prepared using a single 0.38 mm thick PVB interlayer as described in relation to FIGS. 1 and 2. The glass sheets were 3 mm thick. Samples were prepared with interlayer prepared using the printer and method described with reference to FIGS. 9 and 10 (Sample A) and FIG. 13 (Sample B). Glass laminates were produced using the conventional laminating process described above. Both samples of resultant glass laminate had good lamination strength. The images on the interlayers were of excellent quality with no significant distortion evident.

Example 2

Samples of laminated glass were prepared from interlayer PVB interlayer printed using the drop on demand flat bed printer described in relation to FIGS. 14 to 16. The laminate was formed in accordance with the embodiment described with reference to FIGS. 3 and 4 (total three layers of interlayer—one either side of the printed interlayer) using the conventional laminating process described above.

The following lamination image was of excellent quality with no significant distortion.

The samples were subjected to tests in accordance with Australian standard AS2208-1996 for laminated safety glass which include boil and fragmentation tests. These tests were performed on laminated glass sheets respectively having light medium and dark images printed on the interlayer. The darker images correspond to a greater amount of ink, paint or dye per unit area of the interlayer. In each case the samples were found to meet the Australian standard.

While some of the above examples made in accordance with the present invention met the Australian standard tests for safety glass or Grade A applications of laminated glass, the present invention is not limited to such applications. The present invention may be also used in other glass applications that are not required to meet safety glass or Grade A standards.

In addition, and as mentioned above, while the examples described concern the production of laminated glass using glass sheets, it is within the scope of the invention to apply the invention to various other materials suitable for lamination, such as polycarbonate, acrylic, CAB and other thermoplastic resins.

Sheets of different materials may be used in the production process to achieve the same result. For example, one sheet may be made from polycarbonate while the other sheet can be made from glass to form a polycarbonate-interlayer-glass sandwich to be bonded to form a laminated sheet.

In addition, it is also within the scope of the invention to use suitable materials for the interlayer such as a polyether based aliphatic thermoplastic polyurethane interlayer or the like. For example, PE399 Krystalflex® film may be used to form the interlayer.

The foregoing describes only some embodiments of the invention and modifications can be made without departing from the scope of the invention.

The invention claimed is:

1. A method of producing an image carrying laminated material, comprising:
   providing a sheet of interlayer subject to stretching under tension,
   mechanically stabilizing the sheet of interlayer such that the sheet of interlayer is substantially not under tension,
   forming an image on a first surface of the mechanically stabilized sheet of interlayer,
   removing the mechanical stabilization,
   curing the image on the interlayer at ambient temperature for 24 hours or more,
   interposing the sheet of interlayer with the image cured between two sheets of material, and
   joining the two sheets of material by activating the sheet of interlayer;
   wherein
   the image is formed by ink jet printing on the first surface of the sheet of interlayer with a solvent based pigmented ink system,
   the solvent etches the first surface of the interlayer sheet such that a printed pigment is not on the interlayer surface immediately contacting the adjacent sheet of material;
   the mechanical stabilization prevents the sheet of interlayer from stretching or deforming during the ink jet printing;
   the sheet of interlayer is a polyvinylbutyral sheet or a polyether based aliphatic thermoplastic polyurethane sheet; and
   the two sheets of material are glass.

2. The method of claim 1 wherein the mechanical stabilization of the sheet of interlayer, comprises passing the interlayer across a flat bed of a printer through a pair of pinch rollers positioned adjacent to an ink jet print head.

3. The method of claim 1 wherein said mechanically stabilizing the sheet of interlayer is performed by supporting the interlayer with a removable membrane during forming of the image.

4. The method of claim 3 wherein the interlayer is temporarily attached to the membrane.

5. The method of claim 3 wherein the membrane material is selected from fiber reinforced vinyl and paper.

6. The method of claim 1 wherein the mechanically stabilizing the sheet of interlayer is performed by removably attaching the interlayer to a component of a printing machine.

7. The method of claim 6 wherein the component is a rotating drum.

8. The method of claim 1 wherein said image is formed by a piezoelectric drop-on-demand digital printing process.

9. The method of claim 1 wherein joining said two sheets of material further comprises interposing a second sheet of interlayer between the first surface and the sheet of material adjacent the first surface.

10. The method of claim 9 further comprising interposing a third sheet of interlayer between a surface of the interlayer opposite said first surface and the sheet of material adjacent the opposite surface.

11. The method of claim 1 further comprising forming a second image on a surface of a second sheet of interlayer and interposing the second sheet of interlayer between said sheets of material.

12. The method of claim 1 wherein the sheet of interlayer is a polyvinylbutyral sheet.

13. The method of claim 1 wherein the interlayer is a heat-softening interlayer and wherein the two sheets of glass are joined by heating the interlayer.

14. The method of claim 13 wherein said image is formed by a piezoelectric drop-on-demand digital printing process.

15. The method of claim 1 wherein the ink jet printing is carried out using a printer containing heads and the ink system is preheated in the heads.

16. The method of claim 1 wherein the image carrying laminated material meets the requirements of Australian standard AS2208-1996 for laminated safety glass.

17. The method of claim 1, wherein the solvent based pigmented ink system comprises methyl isobutyl ketone.

18. The method of claim 3 wherein the interlayer and the membrane are passed around two positioning rollers and wherein the ink jet printing occurs between the two positioning rollers.

19. The method of claim 4 wherein the interlayer and the membrane are passed around two positioning rollers and wherein the ink jet printing occurs between the two positioning rollers.

20. The method of claim 4 wherein the membrane is taped to the interlayer.

21. The method of claim 7 wherein the interlayer is attached to the rotating drum by conventional adhesive tape or a vacuum.

* * * * *